(No Model.) 2 Sheets—Sheet 1.
J. G. ARCHER.
HAY RAKE.
No. 513,552. Patented Jan. 30, 1894.
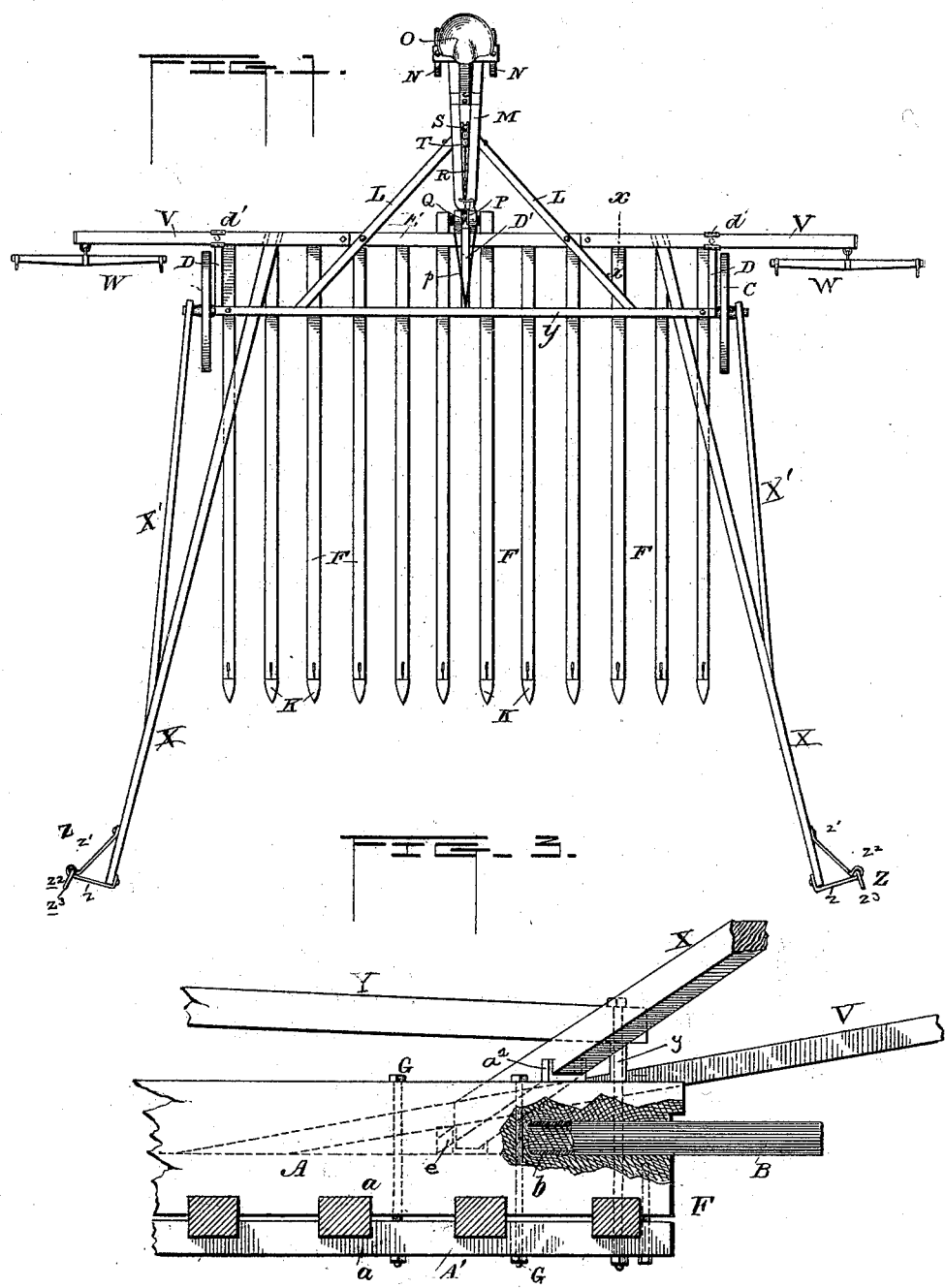

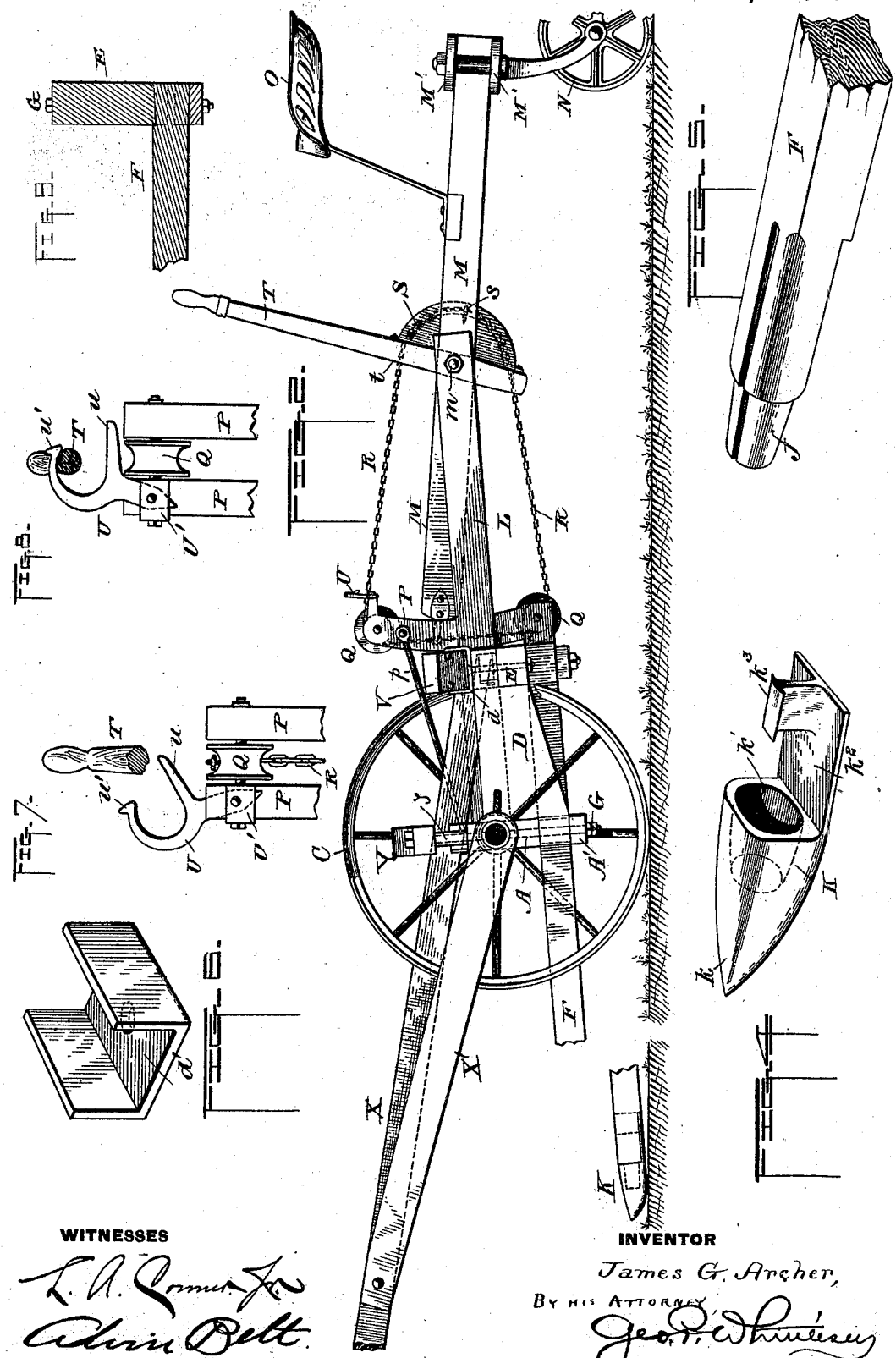

UNITED STATES PATENT OFFICE.

JAMES GARDNER ARCHER, OF BROOKFIELD, MISSOURI.

HAY-RAKE.

SPECIFICATION forming part of Letters Patent No. 513,552, dated January 30, 1894.

Application filed January 18, 1890. Serial No. 337,280. (No model.)

*To all whom it may concern:*

Be it known that I, JAMES GARDNER ARCHER, a citizen of the United States, residing at Brookfield, in the county of Linn and State of Missouri, have invented certain new and useful Improvements in Hay-Rakes; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to that class of rakes known as "hay gatherers." It is especially valuable for gathering hay from swaths, bunches, or windrows, also oats in shock, and carrying them to a designated place, for loading upon a wagon, or for forming into stacks.

The invention consists in certain constructions and arrangements of parts, as hereinafter set forth and particularly pointed out in the claims.

In the drawings, Figure 1 is a top plan view of my improved rake. Fig. 2 is a side elevation partly broken away. Fig. 3 is a front elevation of one end of the frame partly in section. Fig. 4 is a perspective view of the tip for the teeth. Fig. 5 shows the end of a tooth prepared to receive the tip, and Fig. 6, is a detail of one of the metal parts. Figs. 7 and 8 illustrate the automatic locking-hook. Fig. 9 is a detail section on the line $x$—$x$ of Fig. 1.

The same letters refer to corresponding parts in all the figures.

The main portion of the frame of the machine is the rake head "A," which consists of a beam, preferably of wood, extending the entire width of the machine, and of such a depth as to resist all bending strain. From the ends of the rake-head project the axles "B," consisting preferably of metallic tubes inserted into holes bored in the beam "A." The inner ends of the tubes are beveled to a sharp edge "$b$," in order to permit the tubes to be driven into the solid wood at the ends of the holes prepared to receive them, as clearly shown in Fig. 3. The depth of the rake head enables the holes for the axles to be placed at any convenient height to suit the size of the wheels "C."

To each end of the rake head is bolted or otherwise fastened a head block "D," projecting rearwardly, and at the middle of the rake head is similarly secured a similar center block D'. To the under side of these blocks is secured a back-bar E.

To the lower edge of the rake-head is secured at regular intervals the series of parallel teeth F, which consist of long bars, extending in front of the head and normally inclined downwardly so that their front ends rest upon the ground. The teeth are rectangular in cross-section and are held up against the head by a bar A'. The under side of the head and the upper side of the bar are preferably provided with notches $a$, $a'$, the head A, and the bar A' constituting the jaws in which the teeth are held. The bar A' is firmly secured to the head, preferably by bolts G. The rear ends of the teeth extend under the back bar E, and are secured thereto the same as A, A, with rear end of tooth dovetailed. Their front ends are tipped with metal, preferably in the manner shown in Figs. 1, 2, 4, and 5, wherein is shown a tip K, a socket $k'$, and a rearwardly extending foot $k^2$, having an upwardly projecting stud $k^3$, one-eighth of an inch thick or more, in height the tooth's thickness, and one or one and one-fourth inches wide, with cap one-half inch wide and two inches long, pointed at front end. The end of the tooth is formed with a tenon $f$, to enter the socket $k'$, and is slit longitudinally, for several inches, as shown in Fig. 5. When the tip K is applied to the tooth, the stud $k^3$ enters the slit and slightly separates the two halves of the tooth; the ends are then brought together and forced into the socket $k'$, which compresses them about the stud and holds the tip firmly in place. The tips of the teeth normally rest on the ground, but when the machine is in transit along a highway, or carrying a load of hay from one part of the field to another, it is desirable to elevate the teeth to prevent them from catching upon obstacles. In order to do this, the following means are provided:—Mortised into the rake head are two timbers L, converging toward each other and bolted upon the back bar E. Their rear ends lie near together, and between them is pivoted at about the middle of its length, a rocking-beam M, by means of bolt $m$. This beam is composed of two members, separated at their rear ends, and thus forming a horizontal V-shaped structure. The rear ends are secured to cross bars M', to which are swiveled the caster wheels N, which are free to turn in any direction, and support the end of the rocking-beam steadily, and at a constant height above the ground. A driver's seat O is suitably mounted on the beam, which thus serves as a trailing seat frame. The front end of the rocking beam is received between two parallel uprights or quadrants P, which are firmly secured to the back bar E and center block D', and form a guide in which the end of the beam M can play up and down. The quadrants may be suitably braced, as by the rods $p$, running to the rake head A. Between the ends of the quadrant are journaled the sheaves Q, around which passes a chain R, which is firmly fastened to the end of rocking beam. It is evident that if this end of the beam be lifted, it will lift with it the rear end of the bracket timbers L; but since the bracket timbers L are fulcrumed upon the axles B, by reason of their rigid attachment to the rake-head A, it follows that the rake-head will be tilted, and the tips of the teeth will be depressed when the pivot $m$ is raised. Vice-versa, when the front end of the rocking beam is depressed, the tips of the teeth will be elevated. With the parts proportioned as shown in Fig. 1, the tips of the teeth would rise two or three times as far as the pivot $m$ was lowered.

In order to operate the chain, and rock the beam M, I prefer to connect the chain to a segmental sheave S mounted loosely on the bolt $m$ between the arms of the beam. A stud $s$, driven into the sheave near its center, permits different links of the chain to be hooked upon it and thereby gives a greater or less elevation to the teeth according to the surface of the ground. Rigidly fixed to the segmental sheave is a lever T, extending up within easy grasp of the driver. When the lever is thrown forward, the front end of the rocking-beam is depressed, and the teeth are elevated. A hook U is attached to the upper end of one of the quadrants P, with which the handle of the lever can be engaged when thrown down, to hold it securely while the machine is being drawn along the roads, or about the fields. This hook is preferably constructed as shown more clearly in Figs. 7 and 8. It is provided with a laterally projecting arm $u$, which extends over the chain R. When the hook is thrown back, as in Fig. 7, the arm stands inclined upwardly, in the path of the descending lever T, the point of the hook being tipped back out of the way of the lever. The point may have a slanting face $u'$, so that in case the lever happens to strike it, the hook will be crowded back and permit the lever to pass it. The hook is preferably pivoted in a housing U', which acts as a stop to prevent the hook from falling too far back. When the lever strikes the arm $u$, the hook is immediately swung forward over the lever as shown in Fig. 8, and prevents it from rising, which it has a constant tendency to do, owing to the weight of the rake-teeth F. A touch of the hand or foot of the driver, however, pressing either the lever or the hook, sidewise, will release the lever, which then flies up, allowing the front end of the rocking beam to rise, and the rake teeth to fall. The draft animals are attached to each end of the rake head A so as to travel outside of the path of the teeth F. I prefer to fasten an arm V near each end of the back bar E, projecting up over the head-block D and beyond the wheel C. A metal chain $d$ secured to the head block, receives the arm and holds it firmly by means of the flange $d'$ bent down upon the arm. To the outer end of the arms are swiveled the whiffle-trees W. The backing poles X rest in chairs $e$ and $a^2$ on the back bar E and head A respectively, projecting outwardly and upwardly to a point in front of the whiffle-trees. They are shouldered to fit under and bear rearwardly against the arms V, but are not fastened in any way, so that they can be easily pulled out when the machine is housed. A cap Y is placed on the poles and bolted to the head, suitable sleeves $y$ being placed around the bolts to keep the cap at the right distance above the head. The end bolts pass down through the axle B and under jaws A', thus holding all these parts firmly together. The cap acts also as a truss to stiffen the rake-head, and keep the hay from falling off rearwardly. A brace X' runs from each pole to the end of the axle B, being provided with an eye to fit over the axle. At the front end of each pole is a ring-brace Z comprising arms $z$ $z'$, bent to produce an eye $z^2$, in which a ring $z^3$ is inserted to which latter the breast strap or collar of the horse is fastened.

Having thus described my invention, what I claim, and desire to secure by Letters Patent, is—

1. The combination with a rake-head composed of a deep beam A, of the axles B driven into the same, the depth of the beam being sufficient to allow of the vertical adjustment of the axle therein to suit different sizes of wheels, substantially as described.

2. The combination with a rake head composed of the beam A, of the tubular axles B, having the sharpened ends $b$, driven into the ends of said beam, substantially as described.

3. The combination with the loose backing pole X of the brace X', secured thereto, and having an eye, engaging with the outer end of the axle B, substantially as described.

4. The combination with a rake-head, and axle, of a pole removably connected with the rake head, and a brace projecting from the pole and connected with the axle, substantially as set forth.

5. The combination with a pole, of a ring brace consisting of arms $z$, $z'$ bent at an angle to each other to form an eye $z^2$, said arms secured at their free ends to the pole and projecting outwardly therefrom, and a ring held in the eye, substantially as set forth.

In testimony whereof I affix my signature in presence of two witnesses.

JAMES GARDNER ARCHER.

Witnesses:
D. F. HOWARD,
W. H. ADAMS.